(12) United States Patent
Yoshinaga et al.

(10) Patent No.: US 7,771,518 B2
(45) Date of Patent: Aug. 10, 2010

(54) ASYMMETRIC HOLLOW FIBER GAS SEPARATION MEMBRANE AND GAS SEPARATION METHOD

(75) Inventors: Toshimune Yoshinaga, Chiba (JP); Kenji Fukunaga, Chiba (JP); Yutaka Kanetsuki, Yamaguchi (JP); Hiroshi Uchida, Yamaguchi (JP); Minoru Shigemura, Yamaguchi (JP); Nozomu Tanihara, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 499 days.

(21) Appl. No.: 11/795,892

(22) PCT Filed: Jan. 19, 2006

(86) PCT No.: PCT/JP2006/000686

§ 371 (c)(1),
(2), (4) Date: Jul. 24, 2007

(87) PCT Pub. No.: WO2006/077903

PCT Pub. Date: Jul. 27, 2006

(65) Prior Publication Data

US 2008/0134885 A1    Jun. 12, 2008

(30) Foreign Application Priority Data

Jan. 24, 2005    (JP) ............... 2005-015939

(51) Int. Cl.
*B01D 53/22*    (2006.01)
*B01D 71/06*    (2006.01)
*B01D 71/64*    (2006.01)

(52) U.S. Cl. ............ 96/4; 96/8; 96/10; 96/11; 96/12; 96/13; 96/14; 95/45; 95/47; 95/54; 95/55; 210/640; 210/500.27; 210/500.28; 210/500.39

(58) Field of Classification Search .......... 96/4, 96/8, 10, 11, 12, 13, 14; 95/45, 47, 51, 54, 95/55; 210/640, 641, 500.27, 500.28, 500.39
See application file for complete search history.

(56) References Cited

U.S. PATENT DOCUMENTS

| 4,948,400 | A | * | 8/1990 | Yamada et al. | 96/10 |
|---|---|---|---|---|---|
| 4,954,144 | A | * | 9/1990 | Burgoyne et al. | 95/54 |
| 5,042,992 | A | * | 8/1991 | Blinka et al. | 95/51 |
| 5,042,993 | A | * | 8/1991 | Meier et al. | 95/47 |
| 5,076,816 | A | * | 12/1991 | Avrillon et al. | 95/51 |
| 5,076,817 | A | * | 12/1991 | Hayes | 95/47 |
| 5,286,539 | A | * | 2/1994 | Kusuki et al. | 96/10 |
| 6,660,062 | B2 | * | 12/2003 | Liu et al. | 95/45 |
| 6,709,491 | B2 | * | 3/2004 | Kawakami et al. | 96/4 |
| 6,716,270 | B2 | * | 4/2004 | Ding et al. | 95/45 |
| 2008/0017029 | A1 | * | 1/2008 | Kase et al. | 95/50 |

FOREIGN PATENT DOCUMENTS

| EP | 0 446 947 A2 | * | 9/1991 |
|---|---|---|---|
| JP | 02-169019 | | 6/1990 |
| JP | 3267130 | | 11/1991 |
| JP | 03-284334 | | 12/1991 |
| JP | 04-016213 | | 1/1992 |
| JP | 05-068859 | | 3/1993 |
| JP | 11-009979 | | 1/1999 |
| JP | 2003-024755 | | 1/2003 |
| JP | 2004-516131 | | 6/2004 |
| JP | 2004-267810 | | 9/2004 |

* cited by examiner

*Primary Examiner*—Jason M Greene
(74) *Attorney, Agent, or Firm*—Young & Thompson

(57) ABSTRACT

An asymmetric hollow-fiber gas separation membrane is made of a soluble aromatic polyimide that is composed of a specific repeating unit. The tetracarboxylic acid component of the unit has a diphenylhexafluoropropane structure and a biphenyl structure. The diamine component of the unit essentially contains diaminobenzoic acids and any of diaminodibenzothiophenes, diaminodibenzothiophene=5,5-dioxides, diaminothioxanthene-10,10-diones, and diaminothioxanthene-9,10,10-triones.

14 Claims, No Drawings

ASYMMETRIC HOLLOW FIBER GAS SEPARATION MEMBRANE AND GAS SEPARATION METHOD

FIELD OF THE INVENTION

The present invention relates to an asymmetric hollow-fiber gas separation membrane that is made of a soluble aromatic polyimide composed of a specific repeating unit and has an extremely excellent gas permeation performance and a practical mechanical strength, and to a gas separation method using the asymmetric hollow-fiber gas separation membrane.

BACKGROUND ART

Patent Document 1 discloses an asymmetric hollow-fiber gas separation membrane made of polyimide that is composed of 4,4'-(hexafluoroisoproylidene) diphthalic acid and biphenyl tetracarboxylic acid as a tetracarboxylic acid component, and diaminodiphenylene sulfones (the same as diaminodibenzothiophene=5,5-dioxides described later) and others as an main ingredient of a diamine component. This asymmetric hollow-fiber gas separation membrane, as is known from the Examples described in the document, has a hydrogen gas permeation rate ($P'_{H2}$) of 71 to 88×10$^{-5}$ cm$^3$/cm$^2$·sec·cmHg and a ratio of hydrogen gas permeation rate to nitrogen gas permeation rate ($P'_{H2}/P'_{N2}$) of 36 to 41. Although the membrane has such high gas permeation performance, there is still room for further improvement on its gas permeation performance. The document also discloses that an aromatic diamine compound having plural benzene rings is preferably used in combination with a diamine such as diaminodiphenylene sulfones, and that 3,5-diaminobenzoic acid or the like may be used in an amount of 10 mol % or less. However, there is not any description in the document about the use of 3,5-diaminobenzoic acid in an amount of more than 10 mol %.

Reference Patent Document 2 discloses a gas separation membrane made of a copolymer polyimide that is composed of 4,4'-(hexafluoroisoproylidene)-bis(phthalic anhydride) as the tetracarboxylic acid component, and 3,7-diamino-2,8-dimethyldiphenyl sulfone (the same as 3,7-diamino-2,8-dimethyldibenzothiophene=5,5-dioxide described later) and a hydrophilic diamine as the diamine component. The document describes that the gas separation membrane may use 4,4'-(hexafluoroisoproylidene)-bis(phthalic anhydride) and 3,3',4,4'-biphenyltetracarboxylic dianhydride in combination as the tetracarboxylic acid component, and further describes that 1,3-diamino-5-benzoic acid (the same as 3,5-diaminobenzoic acid described later) may be used as the hydrophilic diamine. However, in the Examples described in the document, only the gas permeabilities of carbon dioxide and methane are described for the uniform membrane (film) obtained by casting polyimide. Further, there is described no specific example of using 3,5-diaminobenzoic acid as a hydrophilic diamine. That is, there were no disclosures and implications about the polyimide that is composed of 4,4'-(hexafluoroisoproylidene)-diphthalic acid and biphenyltetracarboxylic acid as the tetracarboxylic acid component, and 3,7-diamino-2,8-dimethyldiphenyl sulfone and 3,5-diaminobenzoic acid as the diamine component, whether or not the polyimide is suitable for the production of an asymmetric hollow-fiber membrane, whether or not the film has an improved gas permeation performance for the separation of hydrogen gas, oxygen gas, nitrogen gas, and others, and whether or not the asymmetric hollow-fiber membrane has a practical mechanical strength required for hollow-fiber membranes in general.

Patent Document 1: Japanese Patent Laid-Open Publication No. H03-267130, and

Patent Document 2: Japanese Patent Application Laid-Open No. 2004-516131.

DISCLOSURE OF THE INVENTION

Problems to be Solved by the Invention

It is an object of the present invention to provide an asymmetric hollow-fiber gas separation membrane that is made of a soluble aromatic polyimide composed of a specific repeating unit and has an improved gas permeation performance and a practical mechanical strength, and a gas separation method using the asymmetric hollow-fiber gas separation membrane. In particular, it is an object of the present invention to provide an asymmetric hollow-fiber gas separation membrane that has excellent separation performances between hydrogen gas or helium gas and nitrogen gas, and between oxygen gas and nitrogen gas, and has a practical mechanical strength, and to provide a gas separation method using the asymmetric hollow-fiber gas separation membrane, including a method for selective separation and recovery of hydrogen gas from a mixed gas containing hydrogen gas and a method for selective separation and recovery of oxygen gas or nitrogen gas from a mixed gas containing oxygen gas and nitrogen gas.

Means for Solving the Problems

The present invention relates to an asymmetric hollow-fiber gas separation membrane that is made of a soluble aromatic polyimide composed of a repeating unit represented by general formula (1).

[Formula 1]

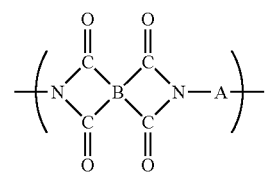

Formula (1)

B in general formula (1), from 10 to 60 mol % thereof is a tetravalent unit B1 having a diphenylhexafluoropropane structure represented by general formula (2),

[Formula 2]

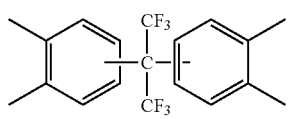

Formula (2)

and from 90 to 40 mol % thereof is a tetravalent unit B2 having a biphenyl structure represented by general formula (3);

[Formula 3]

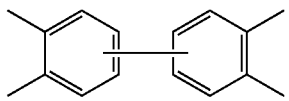

Formula (3)

and A in general formula (1), from 85 to 20 mol % thereof is a divalent unit A1 represented by general formula (4) and/or a divalent unit A2 represented by general formula (5),

[Formula 4]

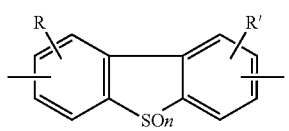

Formula (4)

(In general formula (4), R and R', each is hydrogen atom or an organic group; and n is 0, 1, or 2)

[Formula 5]

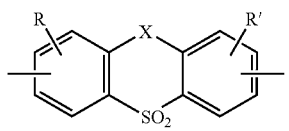

Formula (5)

(In general formula (5), R and R', each is hydrogen atom or an organic group; and X is —$CH_2$— or —CO—.)
and from 15 to 80 mol % thereof is a divalent unit A3 represented by general formula (6)]

[Formula 6]

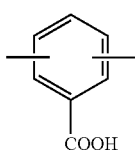

Formula (6)

Further, the present invention relates to the asymmetric hollow-fiber gas separation membrane, in which A1 is a divalent unit that is given by eliminating an amino group from 3,7-diamino-dimethyldibenzothiophene=5,5-dioxide, and A3 is a divalent unit that is given by eliminating an amino group from 3,5-diaminobenzoic acid.

Still further, the present invention relates to the asymmetric hollow-fiber gas separation membrane that has a hydrogen gas permeation rate ($P'_{H2}$) of $50 \times 10^{-5}$ $cm^3$ (STP)/$cm^2 \cdot sec \cdot cmHg$ or more, the ratio of hydrogen gas permeation rate to nitrogen gas permeation rate ($P'_{H2}/P'_{N2}$) of 50 or more, and a tensile strength of 2.5 kgf/$mm^2$ or more and an elongation at break of 15% or more as a hollow-fiber membrane.

Still further, the present invention relates to the asymmetric hollow-fiber gas separation membrane that has an oxygen gas permeation rate ($P'_{O2}$) of $3 \times 10^{-5}$ $cm^3$ (STP)/$cm^2 \cdot sec \cdot cmHg$ or more, the ratio of oxygen gas permeation rate to nitrogen gas permeation rate ($P'_{O2}/P'_{N2}$) of 3.5 or more, and a tensile strength of 2.5 kgf/$mm^2$ or more and an elongation at break of 15% or more as a hollow-fiber membrane.

Still further, the present invention relates to a method for selective separation and recovery of hydrogen gas from a mixed gas containing hydrogen gas using the asymmetric hollow-fiber gas separation membrane, and a method for selective separation and recovery of oxygen gas or nitrogen gas from a mixed gas containing oxygen gas and nitrogen gas using the asymmetric hollow-fiber gas separation membrane.

BEST MODE FOR CARRYING OUT THE INVENTION

The asymmetric hollow-fiber gas separation membrane of the present invention is made of a soluble aromatic polyimide that is composed of a specific repeating unit, having an asymmetric structure consisting of an extremely thin dense layer (preferably 0.001 to 5 μm in thickness) mainly providing gas separation performance and a relatively thick porous layer (preferably 10 to 2,000 μm in thickness) supporting the dense layer, having an inside diameter of approximately 10 to 3,000 μm and an outside diameter of approximately 30 to 7,000 μm. The asymmetric hollow-fiber gas separation membrane of the present invention is an improved asymmetric hollow-fiber gas separation membrane having an extremely excellent gas permeation performance and a practical mechanical strength.

The aromatic polyimide that forms the asymmetric hollow-fiber gas separation membrane of the present invention is represented by the repeating unit of the aforementioned general formula (1).

Namely, the tetravalent unit that is derived from the tetracarboxylic acid component is composed of 10 to 60 mol % of an unit having a diphenylhexafluoropropane structure represented by general formula (2) and 90 to 40 mol % of another unit having a biphenyl structure represented by general formula (3). When the diphenylhexafluoropropane structure is less than 10 mol % and the biphenyl structure exceeds 90 mol %, the gas permeation performance of the resulting polyimide is lowered, thereby making it difficult to obtain a high performance gas separation membrane. On the other hand, when the diphenylhexafluoropropane structure exceeds 60 mol % and the biphenyl structure is less than 40 mol %, the mechanical strength of the resulting polyimide is lowered, thereby making it impossible to obtain a hollow-fiber membrane having a practical mechanical strength.

The divalent unit that is derived from the diamine component is composed of 85 to 20 mol % and preferably 80 to 40 mol % of an unit having a structure represented by general formula (4) and/or general formula (5), and 15 to 80 mol % and preferably 20 to 60 mol % of another unit having a diaminobenzoic acid structure represented by general formula (6). When the unit of the diaminobenzoic acid structure is less than 15 mol %, it becomes difficult to obtain a high performance gas separation membrane. It is undesirable that the unit exceeds 80 mol %, because the dope viscosity becomes too high or the resulting polyimide becomes insoluble in a solvent so that the polyimide cannot be used for a spinning dope.

Hereinafter will be explained monomers that are the constituents of the above-mentioned each unit of the aromatic polyimide forming the asymmetric hollow-fiber gas separation membrane of the present invention. The unit having the diphenylhexafluoropropane structure represented by general formula (2) is obtained by using as the tetracarboxylic acid component 4,4'-(hexafluoroisoproylidene)diphthalic acid, dianhydrides thereof, and esterified compounds thereof.

The unit having the biphenyl structure represented by general formula (3) is obtained by using as the tetracarboxylic acid component biphenyltetracarboxylic acids such as biphenyltetracarboxylic acid, dianhydrides thereof, and esterified compounds thereof. The biphenyltetracarboxylic acids may preferably include 3,3',4,4'-biphenyltetracarboxylic acid, 2,3,3',4-biphenyltetracarboxylic acid, 2,2',3,3'-biphenyltetracarboxylic acid, dianhydrides thereof, and esterified compounds thereof, and particularly preferably 3,3',4,4'-biphenyltetracarboxylic acid, dianhydrides thereof, and esterified compounds thereof.

The unit having the structure represented by general formula (4) or general formula (5) is obtained by using as the diamine component aromatic diamines, each represented by general formula (7) and general formula (8) respectively.

[Formula 7]

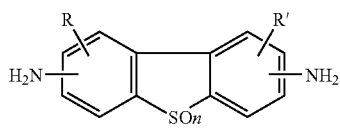

Formula (7)

(In general formula (7), R and R', each is hydrogen atom or an organic group; and n is 0, 1, or 2)

[Formula 8]

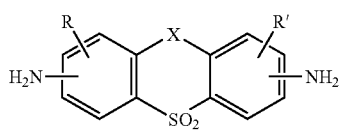

Formula (8)

(In general formula (8), R and R', each is hydrogen atom or an organic group; and X is —CH$_2$— or —CO—.)

As the aromatic diamine represented by general formula (7), there may be preferably mentioned diaminodibenzothiophenes represented by general formula (9) that are given by selecting 0 as n in general formula (7) and diaminodibenzothiophene=5,5-dioxides represented by general formula (10) that are given by selecting 2 as n in general formula (7).

[Formula 9]

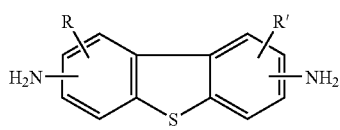

Formula (9)

(In general formula (9), R and R', each is hydrogen atom or an organic group.)

[Formula 10]

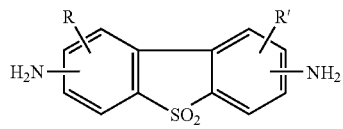

Formula (10)

(In general formula (10), R and R', each is hydrogen atom or an organic group.)

The foregoing diaminodibenzothiophenes (represented by general formula (9)) may include, for example, 3,7-diamino-2,8-dimethyldibenzothiophene, 3,7-diamino-2,6-dimethyldibenzothiophene, 3,7-diamino-4,6-dimethyldibenzothiophene, 2,8-diamino-3,7-dimethyldibenzothiophene, 3,7-diamino-2,8-diethylbenzothiophene, 3,7-diamino-2,6-diethylbenzothiophene, 3,7-diamino-4,6-diethylbenzothiophene, 3,7-diamino-2,8-dipropyldibenzothiophene, 3,7-diamino-2,6-dipropyldibenzothiophene, 3,7-diamino-4,6-dipropyldibenzothiophene, 3,7-diamino-2,8-dimethoxydibenzothiophene, 3,7-diamino-2,6-dimethoxydibenzothiophene, 3,7-diamino-4,6-dimethoxydibenzothiophene, and the like.

The foregoing diaminodibenzothiophen=5,5-dioxides (represented by general formula (10)) may include, for example, 3,7-diamino-2,8-dimethyldibenzothiophene=5,5-dioxide, 3,7-diamino-2,6-dimethyldibenzothiophene=5,5-dioxide, 3,7-diamino-4,6-dimethyldibenzothiophene=5,5-dioxide, 2,8-diamino-3,7-dimethyldibenzothiophene=5,5-dioxide, 3,7-diamino-2,8-diethylbenzothiophene=5,5-dioxide, 3,7-diamino-2,6-diethylbenzothiophene=5,5-dioxide, 3,7-diamino-4,6-diethylbenzothiophene=5,5-dioxide, 3,7-diamino-2,8-dipropyldibenzothiophene=5,5-dioxide, 3,7-diamino-2,6-dipropyldibenzothiophene=5,5-dioxide, 3,7-diamino-4,6-dipropyldibenzothiophene=5,5-dioxide, 3,7-diamino-2,8-dimethoxydibenzothiophene=5,5-dioxide, 3,7-diamino-2,6-dimethoxydibenzothiophene=5,5-dioxide, 3,7-diamino-4,6-dimethoxydibenzothiophene=5,5-dioxide, and the like.

The diaminothioxanthene-10,10-diones that are given by selecting —CH$_2$— as X in general formula (8) may include, for example, 3,6-diaminothioxanthene-10,10-dione, 2,7-diaminothioxanthene-10,10-dione, 3,6-diamino-2,7-dimethylthioxanthone-10,10-dione, 3,6-diamino-2,8-diethylthioxanthone-10,10-dione, 3,6-diamino-2,8-dipropylthioxanthene-10,10-dione, 3,6-diamino-2,8-dimethoxythioxanthene-10,10-dione, and the like.

The diaminothioxanthene-9,10,10-triones that are given by selecting —CO— as X in general formula (8) may include, for example, 3,6-diamino-thioxanthene-9,10,10-trione, 2,7-diamino-thioxanthene-9,10,10-trione, and the like.

The unit having the diaminobenzoic acid structure represented by general formula (6) is obtained by using diaminobenzoic acids as the diamine component. The diaminobenzoic acids may include, for example, 3,5-diaminobenzoic acid, 3,4-diaminobenzoic acid, and the like.

The diamine component of the aromatic polyimide that forms the asymmetric hollow-fiber gas separation membrane of the present invention is particularly preferably a combination of 85 to 20 mol % of the above-mentioned diaminodibenzothiophene=5,5-dioxides, in particular, 3,7-diaminodimethyldibenzothiophene=5,5-dioxide, and 15 to 80 mol % of the diaminobenzoic acids, in particular, 3,5-diaminobenzoic acid. Note that, the 3,7-diamino-dimethyldibenzothiophene=5,5-dioxide means any of isomers thereof, each having a methyl group on a different position from each other, or a mixture thereof. Generally used is preferably a mixture that contains 3,7-diamino-2,8-dimethyldibenzothiophene=5,5-dioxide, 3,7-diamino-2,6-dimethyldibenzothiophene=5,5-dioxide, and 3,7-diamino-4,6-dimethyldibenzothiophene=5,5-dioxide.

A monomer component other than the above-mentioned tetracarboxylic acid component and diamine component can be used in the aromatic polyimide that forms the asymmetric hollow-fiber gas separation membrane of the present invention in a small amount (generally 20 mol % or less, and particularly 10 mol % or less) as long as the effect of the present invention can be maintained.

The aromatic polyimide that forms the asymmetric hollow-fiber gas separation membrane of the present invention has an excellent solubility in an organic polar solvent. A solution of aromatic polyimide with a high polymerization degree can be easily obtained by polymerizing and imidizing the tetracarboxylic acid component and diamine component in a nearly equi-molar ratio in an organic polar solvent. The resulting aromatic polyimide solution can be used to preferably provide an asymmetric hollow-fiber membrane by a dry-wet spinning process.

The aromatic polyimide solution may be prepared preferably in a two-step process including: a step to form polyamide acid by polymerization reaction of the tetracarboxylic acid component and diamine component that are added to an organic polar solvent in a predetermined ratio at around room temperature; and a step of imidization by heating or chemically with pyridine addition or the like, or in a single-step process in which the tetracarboxylic acid component and diamine component are added in a predetermined ratio in an organic polar solvent and are polymerized and imidized at a high temperature of 100 to 250° C. and preferably 130 to 200° C. It is preferred that the thermal-imidization is performed while eliminated water or alcohol is removed. It is also preferred that the used amounts of the tetracarboxylic acid component and diamine component relative to the organic polar solvent are selected in such a manner that the polyimide concentration in the solvent becomes approximately 5 to 50 wt %, and preferably 5 to 40 wt %.

The aromatic polyimide solution obtained by the polymerization-imidization can be used for spinning without any further treatment. In some cases, for example, the aromatic polyimide solution obtained may be poured into a solvent that does not dissolve the aromatic polyimide so as to precipitate the aromatic polyimide, which is then separated and dissolved again in an organic polar solvent in a predetermined concentration to obtain an aromatic polyimide solution. Thus obtained aromatic polyimide solution may be also used for spinning.

It is preferred that the aromatic polyimide solution used for spinning has a concentration of 5 to 40 wt % and more preferably 8 to 25 wt %, and a solution viscosity (rotational viscosity) of 100 to 15,000 poise at 100° C., more preferably 200 to 10,000 poise, and particularly preferably 300 to 5,000 poise. When a solution viscosity is less than 100 poise, a uniform membrane (film) may be obtained, but it is difficult to obtain an asymmetric hollow-fiber membrane having a high mechanical strength. On the other hand, when a solution viscosity exceeds 15,000 poise, it becomes difficult to extrude the solution through a spinneret, so that an asymmetric hollow-fiber membrane having a desired shape is difficult to obtain.

There is not any limitation on the organic polar solvent mentioned above as long as the solvent can suitably dissolve the resulting aromatic polyimide, but there may be mentioned preferably, for example, a phenol solvent including phenols such as phenol, cresol, and xylenol, catechols having two hydroxyl groups directly bonded to the benzene ring, and halogenated phenols such as 3-chlorophenol, 4-chlorophenol (the same as para-chlorophenol described later), 4-bromophenol, and 2-chloro-5-hydroxytoluene; an amide solvent including amides such as N-methyl-2-pyrolidone, N,N-dimethylformamide, N,N-diethylformamide, N,N-dimethylacetoamide, and N,N-diethylacetamide; and a mixed solvent thereof.

The polyimide asymmetric gas separation membrane of the present invention can be preferably obtained by spinning in a dry/wet process (dry-wet spinning process) by using the aforementioned aromatic polyimide solution. The dry-wet spinning process is a method (phase inversion method) in which firstly a polymer solution is formed into a film; the solvent contained in the surface portion of the film is evaporated so as to form a thin dense layer (separation layer); and then the film with the thin dense layer is immersed in a coagulation liquid (a solvent that is miscible with the solvent of the polymer solution, but does not dissolve the polymer) utilizing the phase separation phenomena proceeding on that occasion and to form micropores, whereby a porous layer (supporting layer) is formed. The dry-wet spinning process has been proposed by Loeb et al. (for example, U.S. Pat. No. 3,133,132). The dry-wet spinning process is a method by which a hollow-fiber membrane is formed by using a spinneret, and is described, for example, in Patent Document 1, Japanese Patent Laid-Open Publication No. S61-133106, and others.

Any spinneret can be used as long as the spinneret can extrude the aromatic polyimide solution into a hollow-fiber-shaped body. A tube-in-orifice spinneret is preferred. The extrusion temperature of the aromatic polyimide solution is generally in the range of about 20° C. to 150° C., and particularly preferably 30° C. to 120° C. The hollow-fiber is spun while a gas or liquid is supplied to the inside of the hollow-fiber that is extruded through the spinneret.

The coagulation liquid does not preferably dissolve the aromatic polyimide components substantially and is miscible with the solvent of the aromatic polyimide solution. There is not any particular limitation on the coagulation liquid, but there may be preferably used water; lower alcohols such as methanol, ethanol, and propylalcohol; ketones having lower alkyl groups such as acetone, diethylketone, and methylethylketone; a mixture thereof, and others.

In the coagulation process, preferably the aromatic polyimide solution is immersed in a primary coagulation liquid that allows the aromatic polyimide solution extruded through a spinneret to be coagulated to such an extent that the follow-fiber shape can be maintained, and then immersed in a secondary coagulation liquid so as to be fully coagulated. Thus coagulated hollow-fiber separation membrane is subjected to solvent substitution treatment in which the coagulation liquid is replaced by hydrocarbon or the other solvent. After that, the membrane is dried and is preferably subjected to further heat treatment. It is desirable that the heat treatment is performed at a temperature lower than the softening temperature or the second transition temperature of the aromatic polyimide used.

The asymmetric hollow-fiber gas separation membrane of the present invention is a hollow-fiber membrane having an asymmetric structure that is composed of an extremely thin dense layer (preferably 0.001 to 5 μm thick) mainly serving for gas separation performance and a relatively thicker porous layer (preferably 10 to 2,000 μm thick) supporting the dense layer, having an inside diameter of approximately 10 to 3,000 μm and an outside diameter of approximately 30 to 7,000 μm, and having an improved, extremely excellent gas permeation performance and a practical mechanical strength. Namely, the asymmetric hollow-fiber gas separation membrane of the present invention preferably has a hydrogen gas permeation rate ($P'_{H2}$) of $50 \times 10^{-5}$ cm$^3$(STP)/cm$^2$·sec·cmHg or more, the ratio of hydrogen gas permeation rate to nitrogen gas permeation rate ($P'_{H2}/P'_{N2}$) of 50 or more, and an elongation at break of 15% or more and more preferably 20% or more and a tensile strength of 2.5 kgf/mm$^2$ or more and more preferably 3.0 kgf/mm$^2$ or more as a hollow-fiber membrane. Further, the asymmetric hollow-fiber gas separation membrane preferably has an oxygen gas permeation rate ($P'_{O2}$) of $3 \times 10^{-5}$ cm$^3$ (STP)/cm$^2$·sec·cmHg or more, a ratio of an oxygen gas permeation rate to nitrogen gas permeation rate ($P'_{O2}/P'_{N2}$) of 3.5 or more and more preferably 4.0 or more, a tensile strength of 2.5 kgf/mm$^2$ or more and more preferably 3.0 kgf/mm$^2$ or more, and an elongation at break of 15% or more and more preferably 20% or more as a hollow-fiber membrane.

The asymmetric hollow-fiber gas separation membrane of the present invention has a tensile strength of 2.5 kgf/mm$^2$ or more, and an elongation at break of 15% or more as a hollow-fiber membrane. The asymmetric hollow-fiber gas separation membrane of the present invention having the foregoing mechanical strength is not easily broken in a process of assembling the hollow-fibers into a module, is easy to handle, and can be assembled into a module in an industrial process. Further, the membrane has a high tensile strength, so that the resulting hollow-fiber membrane module exhibits an excellent pressure resistance. In a shell feed process where an object gas for separation is supplied to the outside of the hollow fibers, the object gas can be separated adequately even though a high pressure gas that develops a pressure difference of up to 200 atms between the shell side and bore side is supplied. Furthermore, in a hollow feed process where an object gas for separation is supplied to the inside of the hollow fibers, the object gas can be separated adequately even though a high pressure gas that develops a pressure difference of up to 100 atms between the bore side and shell side is supplied.

When the tensile strength at break is 2.5 kgf/mm$^2$ or less or the elongation at break is 15% or less as a hollow-fiber membrane, the hollow-fiber membrane becomes easy to break in the process of assembling the hollow-fiber membrane into a module, so that it becomes difficult to assemble the module in an industrial process. The resulting hollow-fiber membrane module has a low pressure resistance, having limitations on its use and use condition, so that it is not a practical gas separation membrane module.

The asymmetric hollow-fiber gas separation membrane of the present invention can be preferably used in the form of a module. For example, a general gas separation membrane module is obtained as follows: 100 to 1,000,000 hollow-fiber membranes with an adequate length are bundled together; the both ends of the bundle are fixed with tube plates made of a thermo-setting resin or the like in such a manner that at least one of both ends of the hollow-fibers are kept opened; the resulting hollow-fiber membrane element composed of the hollow-fiber bundle, tube plates, and others is housed in a vessel having at least a mixed gas inlet, a permeated gas outlet, and a non-permeated gas outlet, and attached to the vessel in such a manner that the space having contact with the inside of the hollow-fibers and the space having contact with the outside of the hollow-fibers are separated. This kind of gas separation membrane module separates gases as follows: a mixed gas is supplied from the mixed gas inlet into the space having contact with the inside or outside of the hollow-fiber membranes; a specific component contained in the mixed gas is selectively permeated through the membranes while the mixed gas flows and contacts with the hollow-fiber membranes; and then the permeated gas is discharged from the permeated gas outlet, and the non-permeated gas is discharged from the non-permeated gas outlet.

The asymmetric hollow-fiber gas separation membrane of the present invention is preferably used to separate and recover hydrogen gas from a mixed gas containing hydrogen gas by supplying a high-pressure mixed gas containing hydrogen gas up to around 200 atms and selectively permeating the hydrogen gas. Further, the asymmetric hollow-fiber gas separation membrane of the present invention is preferably used to separate and recover oxygen gas or nitrogen gas from a mixed gas containing oxygen gas and nitrogen gas by supplying a high-pressure mixed gas containing oxygen gas and nitrogen gas up to around 200 atms and selectively permeating the oxygen gas. The hollow-fiber gas separation membrane of the present invention, due to the hollow-fiber, can provide a large membrane area per apparatus, having a high gas permeation performance, and allowing a high-pressure mixed gas to be supplied for gas separation. In this way, gases can be separated at an extremely high efficiency.

EXAMPLES

The present invention will be further described in detail with reference to the following Examples, but it should be construed that the invention is in no way limited to those Examples.

(Gas Permeation Performance Measurement for Hollow-Fiber Membranes)

An element having an effective length of 10 cm for gas permeation performance evaluation was prepared by using fifteen of asymmetric hollow-fiber membranes, a stainless pipe, and an epoxy resin adhesive. The element was housed in a stainless vessel to have a pencil module. An object gas was supplied at a temperature of 80° C. and a pressure of 1 MPaG to the outside of the hollow-fiber membranes so as to measure the permeation flow amount. A gas permeation rate was calculated from the measured permeation gas flow rate, a pressure of the gas supplied side, a pressure of the gas permeated side, and an effective area of the membrane.

(Tensile Strength and Elongation at Break Measurement for Hollow-Fiber Membranes)

The tensile strength and elongation at break were measured with a tensile tester at an effective length of 20 mm and a cross-head speed of 10 mm/min, and at 23° C. The cross-sectional area of the hollow-fiber membrane was calculated from the dimensions that were measured by observing the cross-section with an optical microscope.

(Solution Viscosity Measurement)

The rotational viscosity of the polyimide solution was measured with a rotation viscometer (at shear rate applied by roter 1.75 sec$^{-1}$) at 100° C.

The compounds used in the following Examples are as follows.

s-BPDA: 3,3',4,4'-biphenyltetracarboxylic dianhydride;

6FDA: 4,4'-(hexafluoroisoproylidene)-bis(phthalic anhydride) (this compound is also called as 2,2-bis(3,4-dicarboxyphenyl)hexafluoropropane dianhydride);

TSN: a mixture containing 3,7-diamino-2,8-dimethyldibenzothiophene=5,5-dioxide as a principal ingredient, and isomers thereof having a methyl group on a different position from one another including 3,7-diamino-2,6-dimethyldibenzothiophene=5,5-dioxide and 3,7-diamino-4,6-dimethyldibenzothiophene=5,5-dioxide;

DABA: 3,5-diaminobenzoic acid; and mDABS: 1,3-diaminobenzene-4-sulfonic acid.

Example 1

To a separable flask equipped with a stirrer and a nitrogen gas inlet tube, 60 mmol s-BPDA, 40 mmol 6FDA, 60 mmol TSN, and 40 mmol DABA were added with a solvent of parachlorophenol in such a manner that the resulting polymer concentration became 18 wt %; while nitrogen gas was passed through the flask and the reaction mixture was stirred, polymerization-imidization was carried out at a reaction temperature of 180° C. for 16 hours so as to prepare an aromatic polyimide solution having a polyimide concentration of 18 wt %. The aromatic polyimide solution had a solution viscosity of 2,270 poise at 100° C.

Thus prepared aromatic polyimide solution was filtered with a 400-mesh metal mesh to obtain a dope solution. The dope solution was extruded as a hollow-fiber-shaped body with a spinning apparatus equipped with a hollow-fiber spinneret (having a circular opening with an outside diameter of 1,000 μm and a slit width of 200 μm, and a core opening with an outside diameter of 400 μm). After the extruded hollow-fiber-shaped body was traveled through a nitrogen gas atmosphere, the hollow-fiber-shaped body was immersed in a primary coagulation liquid (0° C., 75 wt % ethanol aqueous solution). Then, in a secondary coagulation apparatus equipped with a pair of guide rolls, the hollow-fiber-shaped body was traveled back-and-forth between the guide rolls through a secondary coagulation liquid (0° C., 75 wt % ethanol aqueous solution), so that the hollow-fiber-shaped body was coagulated. The resulting coagulated hollow-fiber-shaped body was taken over with a pick-up roll at a speed of 25 m/min to obtain the hollow-fiber membrane. After the hollow-fiber membrane was rolled up around a bobbin and washed with ethanol, the ethanol was replaced by iso-octane, and the hollow-fiber membrane was further heated at 100° C. to evaporate the isooctane. Still further, the hollow fiber was heat-treated at 305° C. for 30 minutes to obtain a final product hollow-fiber membrane.

The final product hollow-fiber was an asymmetric hollow-fiber membrane having an inside diameter of 200 μm and an outside diameter of 400 μm. The gas permeation performance, tensile strength, and elongation at break of the asymmetric hollow-fiber membrane were measured. The results are shown in Table 2.

Examples 2 to 4

Aromatic polyimide solutions and hollow-fiber membranes were prepared similarly to Examples, using the tetracarboxylic acid components and diamine components shown in Table 1.

The gas permeation performance, tensile strength, and elongation at break of the resulting asymmetric hollow-fiber membrane were measured. The results are shown in Table 2.

Comparative Example 1

As shown in Table 1, an aromatic polyimide solution and a hollow-fiber membrane were prepared similarly to Example 1, using the same composition as used in Example 4 except that the tetracarboxylic acid component was 100 mol % s-BPDA.

The gas permeation performance, tensile strength, and elongation at break of the resulting asymmetric hollow-fiber membrane were measured. The results are shown in Table 2. The gas permeation rate was low.

Comparative Example 2

As shown in Table 1, an aromatic polyimide solution and a hollow-fiber membrane were prepared similarly to Example 1, using the same composition as used in Example 1 except that the diamine component was 95 mol % TSN and 5 mol % DABA.

The gas permeation performance, tensile strength, and elongation at break of the resulting asymmetric hollow-fiber membrane were measured. The results are shown in Table 2. The tensile strength was 13% and was not sufficient. The ratios of hydrogen gas permeation rate to nitrogen gas permeation rate ($P'_{H2}/P'_{N2}$), oxygen permeation rate to nitrogen gas permeation rate ($P'_{O2}/P'_{N2}$), and others were low.

Comparative Examples 3 to 6

As shown in Table 1, aromatic polyimide solutions and hollow-fiber membranes were prepared similarly to Example 1, using the compositions containing 6FDA, S-BPDA, or a combination of 6FDA and S-BPDA as the tetracarboxylic acid component, and a combination of TSN and mDABS as the diamine component.

The gas permeation performance, tensile strength, and elongation at break of the resulting asymmetric hollow-fiber membrane were measured. The results are shown in Table 2.

In Comparative Example 3, the ratios of hydrogen gas permeation rate to nitrogen gas permeation rate ($P'_{H2}/P'_{N2}$), oxygen permeation rate to nitrogen gas permeation rate ($P'_{O2}/P'_{N2}$), and others were low, and the tensile strength was only 8%. The membrane was difficult to assemble into a module in an industrial process.

In Comparative Example 4, polyimide polymer was deposited in the course of the polymerization-imidization, so that an aromatic polyimide solution usable as a spinning dope was not obtained.

In Comparative Examples 5 and 6, polyimide was not deposited in the course of the polymerization-imidization, but spinning of hollow-fiber membrane was not achieved because the solution viscosity was around 50 and 30 poise respectively and the polymerization degree was not increased.

TABLE 1

| | Source material Charged composition | | | | | | Dope |
|---|---|---|---|---|---|---|---|
| | Acid anhydride | | Diamine | | | | Viscosity |
| No. | s-BPDA mol % | 6FDA mol % | TSN mol % | DABA mol % | mDABS mol % | Concentration wt % | at 100° C. poise |
| Example 1 | 60 | 40 | 60 | 40 | | 18 | 2270 |
| Example 2 | 60 | 40 | 70 | 30 | | 18 | 2180 |
| Example 3 | 70 | 30 | 60 | 40 | | 18 | 2300 |
| Example 4 | 70 | 30 | 70 | 30 | | 18 | 2030 |
| Comparative Example 1 | 100 | | 70 | 30 | | 18 | 2350 |
| Comparative Example 2 | 60 | 40 | 95 | 5 | | 18 | 2240 |
| Comparative Example 3 | | 100 | 60 | | 40 | 18 | 1000 |
| Comparative Example 4 | 100 | | 30 | | 70 | 18 | — |
| Comparative Example 5 | 100 | | 70 | | 30 | 18 | 50 |
| Comparative Example 6 | 70 | 30 | 70 | | 30 | 18 | 30 |

TABLE 2

| | Hollow-fiber | | | | | | | | | | | | | |
|---|---|---|---|---|---|---|---|---|---|---|---|---|---|---|
| | Tensile test | | Gas permeation performance | | | | | | | | | | | |
| | Tensile Strength | Elongation | Permeation rate at 80° C. × $10^{-5}$ Ncc/(cm$^2$ · s · cmHg) | | | | | | Ratio of Permeation rate | | | | | |
| No. | kgf/mm$^2$ | at break % | P'$_{H2}$ | P'$_{He}$ | P'$_{CO2}$ | P'$_{O2}$ | P'$_{N2}$ | P'$_{CH4}$ | P'$_{C2H6}$ | H2/CH4 | H2/N2 | He/N2 | CO2/CH4 | O2/N2 |
| Example 1 | 4.5 | 16 | 72 | 70 | 16 | 5.2 | 1.1 | 0.63 | 0.16 | 114 | 67 | 65 | 26 | 4.8 |
| Example 2 | 4.3 | 18 | 73 | 71 | 16 | 5.4 | 1.2 | 0.72 | 0.24 | 102 | 62 | 61 | 23 | 4.6 |
| Example 3 | 4.5 | 21 | 70 | 68 | 16 | 5.1 | 1.1 | 0.66 | 0.21 | 105 | 63 | 62 | 24 | 4.6 |
| Example 4 | 4.5 | 19 | 67 | 65 | 15 | 4.8 | 1.0 | 0.58 | 0.15 | 114 | 67 | 65 | 26 | 4.8 |
| Comparative Example 1 | 6.5 | 37 | 32 | 30 | 7 | 2.2 | 0.43 | 0.27 | 0.081 | 116 | 73 | 70 | 24 | 5.2 |
| Comparative Example 2 | 4.3 | 13 | 62 | 59 | 13 | 4.8 | 1.5 | 0.9 | — | 72 | 42 | 40 | 15 | 3.1 |
| Comparative Example 3 | 3.1 | 8 | 89 | 87 | 21 | 7.7 | 2.7 | 2.2 | 1.6 | 41 | 33 | 32 | 10 | 2.9 |
| Comparative Example 4 | Polymer was deposited, so that no spinning dope was prepared for use. | | | | | | | | | | | | | |
| Comparative Example 5 | No fiber was spun, since the dope had low viscosity and poor cobwebbing property. | | | | | | | | | | | | | |
| Comparative Example 6 | No fiber was spun, since the dope had low viscosity and poor cobwebbing property. | | | | | | | | | | | | | |

INDUSTRIAL APPLICABILITY

The present invention provides an asymmetric hollow-fiber gas separation membrane that is made of a soluble aromatic polyimide composed of a specific repeating unit and has an improved, extremely excellent gas permeation performance and a practical mechanical strength.

The asymmetric gas separation membrane of the present invention can be applied to a conventional gas separation module and can selectively separate and recover a specific gas from a mixed gas with a extremely high efficiency. For instance, hydrogen or helium gas can be selectively separated and recovered from a mixed gas containing hydrogen gas or helium gas. Further, oxygen gas or nitrogen gas can be separated and recovered from a mixed gas containing oxygen gas and nitrogen gas.

The invention claimed is:

1. An asymmetric hollow-fiber gas separation membrane made of a soluble aromatic polyimide comprising a repeating unit represented by formula (1),

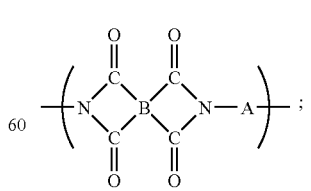

from 10 to 60 mol % of B in formula (1) being a tetravalent unit B1 having a diphenylhexafluoropropane structure represented by formula (2),

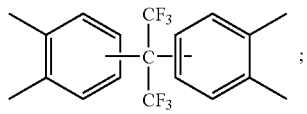

from 90 to 40 mol % of B in formula (1) being a tetravalent unit B2 having a biphenyl structure represented by formula (3),

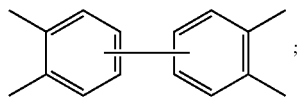

from 85 to 20 mol % of A in formula (1) being a divalent unit A1 represented by formula (4),

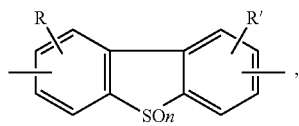

wherein R and R' of formula 4 are each a hydrogen atom or an organic group, and n is 0, 1, or 2, and/or a divalent unit A2 represented by general formula (5),

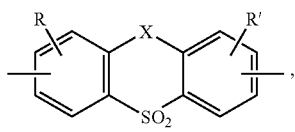

wherein R and R', each is hydrogen atom or an organic group, and X is —$CH_2$— or —CO—; and from 15 to 80 mol % of A in formula (1) being divalent unit A3 represented by general formula (6),

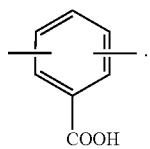

2. The asymmetric hollow-fiber gas separation membrane according to claim 1, wherein from 85 to 20 mol % of A comprises A1, and A1 is a divalent unit given by eliminating an amino group from 3,7-diamino-dimethyldibenzothiophene=5,5-dioxide.

3. The asymmetric hollow-fiber gas separation membrane according to claim 1, wherein A3 is a divalent unit that is given by eliminating an amino group from 3,5-diaminobenzoic acid.

4. The asymmetric hollow-fiber gas separation membrane according to claim 1, wherein the asymmetric hollow-fiber gas separation membrane has a hydrogen gas permeation rate ($P'_{H2}$) of $50×10^{-5}$ $cm^3(STP)/cm^2·sec·cmHg$ or more, a ratio of hydrogen gas permeation rate to nitrogen gas permeation rate ($P'_{H2}/P'_{N2}$) of 50 or more, and, as a hollow-fiber membrane, a tensile strength of 2.5 $kgf/mm^2$ or more and an elongation at break of 15% or more.

5. The asymmetric hollow-fiber gas separation membrane according to claim 1, wherein the asymmetric hollow-fiber gas separation membrane has an oxygen gas permeation rate ($P'_{O2}$) of $3×10^{-5}$ $cm^3(STP)/cm^2·sec·cmHg$ or more, a ratio of oxygen gas permeation rate to nitrogen gas permeation rate ($P'_{O2}/P'_{N2}$) of 3.5 or more, and, as a hollow-fiber membrane, a tensile strength of 2.5 $kgf/mm^2$ or more and an elongation at break of 15% or more.

6. A method of selectively separating and recovering hydrogen gas from a mixed gas containing hydrogen gas, using the asymmetric hollow-fiber gas separation membrane according to claim 4.

7. A method of selectively separating and recovering oxygen gas or nitrogen gas from a mixed gas containing oxygen gas and nitrogen gas, using the asymmetric hollow-fiber gas separation membrane according to claim 5.

8. The asymmetric hollow-fiber gas separation membrane according to claim 2, wherein A3 is a divalent unit that is given by eliminating an amino group from 3,5-diaminobenzoic acid.

9. The asymmetric hollow-fiber gas separation membrane according to claim 2, wherein the asymmetric hollow-fiber gas separation membrane has a hydrogen gas permeation rate ($P'_{H2}$) of $50×10^{-5}$ $cm^3(STP)/cm^2·sec·cmHg$ or more, a ratio of hydrogen gas permeation rate to nitrogen gas permeation rate ($P'_{H2}/P'_{N2}$) of 50 or more, and, as a hollow-fiber membrane, a tensile strength of 2.5 $kgf/mm^2$ or more and an elongation at break of 15% or more.

10. The asymmetric hollow-fiber gas separation membrane according to claim 3, wherein the asymmetric hollow-fiber gas separation membrane has a hydrogen gas permeation rate ($P'_{H2}$) of $50×10^{-5}$ $cm^3(STP)/cm^2·sec·cmHg$ or more, a ratio of hydrogen gas permeation rate to nitrogen gas permeation rate ($P'_{H2}/P'_{N2}$) of 50 or more, and, as a hollow-fiber membrane, a tensile strength of 2.5 $kgf/mm^2$ or more and an elongation at break of 15% or more.

11. The asymmetric hollow-fiber gas separation membrane according to claim 8, wherein the asymmetric hollow-fiber gas separation membrane has a hydrogen gas permeation rate ($P'_{H2}$) of $50×10^{-5}$ $cm^3(STP)/cm^2·sec·cmHg$ or more, a ratio of hydrogen gas permeation rate to nitrogen gas permeation rate ($P'_{H2}/P'_{N2}$) of 50 or more, and, as a hollow-fiber membrane, a tensile strength of 2.5 $kgf/mm^2$ or more and an elongation at break of 15% or more.

12. The asymmetric hollow-fiber gas separation membrane according to claim 2, wherein the asymmetric hollow-fiber gas separation membrane has an oxygen gas permeation rate ($P'_{O2}$) of $3×10^{-5}$ $cm^3(STP)/cm^2·sec·cmHg$ or more, a ratio of oxygen gas permeation rate to nitrogen gas permeation rate ($P'_{O2}/P'_{N2}$) of 3.5 or more, and, as a hollow-fiber membrane, a tensile strength of 2.5 $kgf/mm^2$ or more and an elongation at break of 15% or more.

13. The asymmetric hollow-fiber gas separation membrane according to claim 3, wherein the asymmetric hollow-fiber gas separation membrane has an oxygen gas permeation rate ($P'_{O2}$) of $3×10^{-5}$ $cm^3(STP)/cm^2·sec·cmHg$ or more, a ratio of oxygen gas permeation rate to nitrogen gas permeation rate ($P'_{O2}/P'_{N2}$) of 3.5 or more, and, as a hollow-fiber membrane, a tensile strength of 2.5 $kgf/mm^2$ or more and an elongation at break of 15% or more.

14. The asymmetric hollow-fiber gas separation membrane according to claim 8, wherein the asymmetric hollow-fiber gas separation membrane has an oxygen gas permeation rate ($P'_{O2}$) of $3×10^{-5}$ $cm^3(STP)/cm^2·sec·cmHg$ or more, a ratio of oxygen gas permeation rate to nitrogen gas permeation rate ($P'_{O2}/P'_{N2}$) of 3.5 or more, and, as a hollow-fiber membrane, a tensile strength of 2.5 $kgf/mm^2$ or more and an elongation at break of 15% or more.

* * * * *